United States Patent
Liu et al.

(10) Patent No.: US 9,600,330 B2
(45) Date of Patent: Mar. 21, 2017

(54) METHOD AND SYSTEM FOR REGULATION AND CONTROL OF A MULTI-CORE CENTRAL PROCESSING UNIT

(71) Applicant: HUIZHOU TCL MOBILE COMMUNICATION CO., LTD., Huizhou (CN)

(72) Inventors: Lian Liu, Huizhou (CN); Yuting Wang, Huizhou (CN); Xiaoyong Wu, Huizhou (CN); Xiangjun Zhong, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 206 days.

(21) Appl. No.: 14/398,351

(22) PCT Filed: Jul. 4, 2013

(86) PCT No.: PCT/CN2013/078790
§ 371 (c)(1),
(2) Date: Oct. 31, 2014

(87) PCT Pub. No.: WO2014/032477
PCT Pub. Date: Mar. 6, 2014

(65) Prior Publication Data
US 2015/0113536 A1   Apr. 23, 2015

(30) Foreign Application Priority Data
Aug. 29, 2012   (CN) .......................... 2012 1 0311472

(51) Int. Cl.
*G06F 9/48*   (2006.01)
*G06F 1/32*   (2006.01)
*G06F 9/50*   (2006.01)

(52) U.S. Cl.
CPC ............ *G06F 9/4856* (2013.01); *G06F 1/324* (2013.01); *G06F 1/329* (2013.01); *G06F 1/3287* (2013.01);
(Continued)

(58) Field of Classification Search
CPC ...... G06F 1/3237; G06F 1/324; G06F 1/3287; G06F 1/329; G06F 9/48; G06F 9/4843;
(Continued)

(56) References Cited

U.S. PATENT DOCUMENTS

2008/0005591 A1* 1/2008 Trautman ............... G06F 1/3203
713/300
2008/0310099 A1* 12/2008 Monferrer ............... H01L 23/34
361/679.46
(Continued)

FOREIGN PATENT DOCUMENTS

CN   1690955 A   11/2005
CN   1716190 A   1/2006
(Continued)

OTHER PUBLICATIONS

Search Report and Office Action from CN Application No. 201210311472.X dated Jul. 16, 2016.

*Primary Examiner* — Dennis M Butler
(74) *Attorney, Agent, or Firm* — Shimokaji IP

(57) ABSTRACT

A method and system for regulation and control of a multi-core CPU includes receiving an operating command associated with regulation and control of the multi-core CPU, responding to the operating command, and performing regulation and control on the CPU cores of the multi-core CPU via a bottom layer core interface according to a preset CPU regulation and control mode. Thereby, a working state of every CPU core of a multi-core CPU is regulated and
(Continued)

controlled, processing capability of the multi-core CPU is improved, and energy and electric power are saved.

16 Claims, 3 Drawing Sheets

(52) U.S. Cl.
CPC .......... *G06F 9/4881* (2013.01); *G06F 9/5094* (2013.01); *Y02B 60/142* (2013.01)

(58) Field of Classification Search
CPC .... G06F 9/4856; G06F 9/4881; G06F 9/4893; G06F 9/5094; Y02B 60/142
See application file for complete search history.

(56) References Cited

U.S. PATENT DOCUMENTS

| | | | |
|---|---|---|---|
| 2011/0088041 A1* | 4/2011 | Alameldeen | G06F 9/505 718/105 |
| 2012/0060170 A1* | 3/2012 | Vajda | G06F 9/4893 718/104 |
| 2012/0159496 A1* | 6/2012 | Dighe | G06F 9/4893 718/102 |

FOREIGN PATENT DOCUMENTS

| | | |
|---|---|---|
| CN | 1906587 A | 1/2007 |
| CN | 101201689 A | 6/2008 |
| CN | 101598967 A | 12/2009 |
| JP | 2010079622 A | 4/2010 |

\* cited by examiner

METHOD AND SYSTEM FOR REGULATION AND CONTROL OF A MULTI-CORE CENTRAL PROCESSING UNIT

TECHNICAL FIELD

The present invention relates to the computer field and in particular to a method and system for regulation and control of multi-core central processing unit (CPU).

BACKGROUND

It has become a trend for Android-based mobile devices, such as smart phones and tablet computers, to use dual-core and quad-core processors. As a multi-core CPU has certain advantages in regard to processing capabilities, applications, of a multi-core CPU on mobile devices, are increasingly extensive. While a multi-core CPU improves performance of mobile devices to a certain degree, availability of electrical power in mobile devices is increasingly a bottleneck.

Android multi-core smart phones schedule processes to multiple cores of the multi-core CPU according to a "load balancing mechanism". With such a "load balancing mechanism", however, multiple cores of a multi-core CPU are always in an operating mode, even when a mobile phone is in an idle or low-power state. As a result, electric energy, that has already been in short supply, is wasted in great quantities. When a mobile phone is in an idle or low-power state, a user may pay more attention to how to save power, rather than to an improvement of mobile phone performance. When a mobile phone has sufficient power, a user may want to improve mobile phone performance using processing capability of a multi-core CPU. However, available mobile devices cannot perform regulation and control on a multi-core CPU based on a user's needs.

As a result, the prior art needs to be improved and developed.

SUMMARY

In light of the above shortcomings of the prior art, a method and system is provided for regulation and control of a multi-core CPU, which is intended to solve the problem of the prior art that multi-core CPU cannot be regulated and controlled based on a user's needs.

A method for regulation and control of a multi-core CPU includes receiving an operating command associated with regulation and control of the multi-core CPU; responding to the operating command, and performing regulation and control on CPU cores of the multi-core CPU via a bottom layer core interface according to a preset CPU regulation and control mode, the CPU regulation and control mode comprising at least one of: regulating a number of CPU cores that are turned on, regulating an operating frequency of the CPU cores, migrating processes of the CPU cores; and controlling switching, frequency modulation and process migration of the CPU cores of the multi-core CPU by calling a subsystem of the multi-core CPU.

In another embodiment of a method for regulation and control of a multi-core CPU, a CPU regulation and control mode includes a first regulation and control mode and a second regulation and control mode; the first regulation and control mode corresponds to at least one CPU core of a multi-core CPU that is turned on and runs in a high-frequency state; the second regulation and control mode corresponds to one of the CPU cores of the multi-core CPU that is turned on and runs in a low-frequency state; wherein, when the CPU regulation and control mode is the first regulation and control mode, the method further comprises: recording a number of CPU cores used by a process and a time of the CPU cores used by the process; and migrating a high-frequency process to an idle CPU core for processing, and regulating the idle CPU core to the high-frequency operating state; wherein, when the CPU regulation and control mode is the second regulation and control mode, the method further comprises: recording a number of CPU cores used by a process and a time of the CPU cores used by the process; and shutting down the idle CPU cores, keeping a CPU core in operation, and performing frequency reduction processing on the CPU core in operation.

In a further embodiment of a method for regulation and control of a multi-core CPU, a CPU regulation and control mode includes a third regulation and control mode; when the CPU regulation and control mode is the third regulation and control mode, the method comprises: acquiring information regarding operating states of CPU cores of a multi-core CPU at a predetermined time interval; when a utilization of all CPU cores of the multi-core CPU is lower than a first predetermined value, keeping one of the CPU cores in operation and shutting down other CPU cores, and performing frequency reduction processing on the CPU core in operation; when a utilization of the CPU cores in operation is greater than a second predetermined value, turning on all CPU cores; and maintaining a balance of a utilization of the CPU cores of the multi-core CPU by migrating processes.

In yet another embodiment of a method for regulation and control of a multi-core CPU, controlling switching, frequency modulation and process migration of CPU cores of a multi-core CPU, by calling a subsystem of the multi-core CPU, includes calling a function at a bottom layer or communicating with a bottom layer core via a socket mechanism; acquiring a function for regulating a number of CPU cores that are turned on, an operating frequency of the CPU cores, and process migration; and controlling switching, frequency modulation and process migration of the CPU cores of the multi-core CPU via the function.

In yet a further embodiment, a method for regulation and control of a multi-core CPU includes receiving an operating command associated with regulation and control of the multi-core CPU; responding to the operating command, and performing regulation and control on CPU cores of the multi-core CPU via a bottom layer core interface according to a preset CPU regulation and control mode.

In another embodiment of a method for regulation and control of a multi-core CPU, a CPU regulation and control mode includes at least one of regulating a number of CPU cores that are turned on, regulating an operating frequency of the CPU cores, and migrating processes of the CPU cores.

In a further embodiment, a CPU regulation and control mode includes a first regulation and control mode and a second regulation and control mode; the first regulation and control mode corresponds to at least one of the CPU cores of the multi-core CPU that is turned on and runs in a high-frequency state; the second regulation and control mode corresponds to one of the CPU cores of the multi-core CPU that is turned on and runs in a low-frequency state.

In yet a further embodiment of a method for regulation and control of a multi-core CPU, when a CPU regulation and control mode is a first regulation and control mode, a method comprises: recording a number of CPU cores used by a process and a time of the CPU cores used by the process; and migrating a high-frequency process to an idle CPU core for processing, and regulating the idle CPU core to the high-frequency operating state.

In another embodiment of a method for regulation and control of a multi-core CPU, when a CPU regulation and control mode is a second regulation and control mode, a method comprises: recording a number of CPU cores used by a process and a time of the CPU cores used by the process; and shutting down idle CPU cores, keeping a CPU core in operation, and performing frequency reduction processing on the CPU core in operation.

In a further embodiment of a method for regulation and control of a multi-core CPU, a CPU regulation and control mode includes a third regulation and control mode; when the CPU regulation and control mode is the third regulation and control mode, the method includes acquiring information regarding operating states of CPU cores of a multi-core CPU at a predetermined time interval; when a utilization of all CPU cores of the multi-core CPU is lower than a first predetermined value, keeping one of the CPU cores in operation and shutting down other CPU cores, and performing frequency reduction processing on the CPU core in operation; when a utilization of CPU cores in operation is greater than a second predetermined value, turning on all CPU cores; and maintaining a balance of a utilization of the CPU cores of the multi-core CPU by migrating processes.

In yet a further embodiment of a method for regulation and control of a multi-core CPU, controlling switching, frequency modulation and process migration of CPU cores of a multi-core CPU includes calling a subsystem of the multi-core CPU.

In another embodiment of a method for regulation and control of a multi-core CPU controlling switching, frequency modulation and process migration of the CPU cores of the multi-core CPU by calling a subsystem of the multi-core CPU includes calling a function at a bottom layer or communicating with a bottom layer core via a socket mechanism; acquiring a function for regulating a number of CPU cores that are turned on, an operating frequency of the CPU cores, and process migration; and controlling switching, frequency modulation and process migration of the CPU cores of the multi-core CPU via the function.

In a further embodiment, a system for regulation and control of a multi-core CPU includes an operating command receiving module for receiving an operating command associated with regulation and control of the multi-core CPU; and a regulation and control module for responding to the operating command, and performing regulation and control on the CPU cores of the multi-core CPU via a bottom layer core interface according to a preset CPU regulation and control mode.

In another embodiment, a system for regulation and control of a multi-core CPU, a CPU regulation and control mode includes at least one of: regulating a number of CPU cores that are turned on, regulating an operating frequency of the CPU cores, and migrating processes of the CPU cores.

In a further embodiment of a system for regulation and control of a multi-core CPU, a CPU regulation and control mode at least includes a first regulation and control mode and a second regulation and control mode; the first regulation and control mode corresponds to at least one CPU core of a multi-core CPU that is turned on and runs in a high-frequency state; the second regulation and control mode corresponds to one of CPU core of the multi-core CPU that is turned on and runs in a low-frequency state.

In yet a further embodiment of a system for regulation and control of a multi-core CPU, when a CPU regulation and control mode is a first regulation and control mode, the regulation and control module is used for recording a number of the CPU cores used by a process and a time of the CPU cores used by the process, for migrating a high-frequency process to an idle CPU core for processing, and for regulating the idle CPU core to the high-frequency operating state.

In another embodiment of a system for regulation and control of a multi-core CPU, when a CPU regulation and control mode is a second regulation and control mode, the regulation and control module is used for recording a number of CPU cores used by a process and a time of the CPU cores used by the process, for shutting down idle CPU cores and keeping a CPU core in operation, and for performing frequency reduction processing on the CPU core in operation.

In a further embodiment of a system for regulation and control of a multi-core CPU, a CPU regulation and control mode includes a third regulation and control mode; when the CPU regulation and control mode is the third regulation and control mode, the regulation and control module is used for acquiring information regarding operating states of CPU cores of the multi-core CPU at a predetermined time interval, and for, when a utilization of all CPU cores of the multi-core CPU is lower than a first predetermined value, keeping one of the CPU cores in operation and shutting down other CPU cores, and performing frequency reduction processing on the CPU core in operation; moreover, the regulation and control module is also used for, when a utilization of the CPU cores in operation is greater than a second predetermined value, turning on all CPU cores, and for maintaining a balance of a utilization of the CPU cores of the multi-core CPU by migrating processes.

In yet a further embodiment of a system for regulation and control of a multi-core CPU, a regulation and control module is used for controlling switching, frequency modulation and process migration of CPU cores of the multi-core CPU by calling a subsystem of the multi-core CPU.

In another embodiment of a system for regulation and control of a multi-core CPU, a regulation and control module includes a native service module for calling a function at a bottom layer or communicating with a bottom layer core via a socket mechanism; an acquisition module for acquiring a function for regulating a number of CPU cores that are turned on, an operating frequency of the CPU cores, and process migration; and a control module for controlling switching, frequency modulation and process migration of the CPU cores of the multi-core CPU via the function.

In a further embodiment, a working state of every CPU core of a multi-core CPU is regulated and controlled, and a processing capability of the multi-core CPU is improved or a goal of saving energy and electric power is attained.

DETAILED DESCRIPTION

Figure 1:
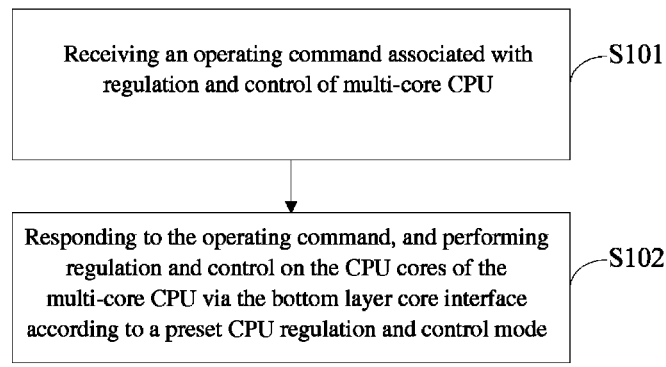
FIG. 1 depicts a flowchart of an example method for regulation and control of a multi-core CPU according to an embodiment of the present invention.

A method and system for regulation and control of a multi-core CPU is described in detail below. It should be understood that specific embodiments described herein are for illustrative purposes only, and are not intended to limit the scope of the appended claims in any way. The term "multi-core CPU," as used herein, is in reference to a CPU having at least two cores, such as a dual-core CPU, a triple-core CPU, a quad-core CPU, etc.

Specific embodiments of methods and systems for regulation and control of a multi-core CPU are described with reference to modules, blocks of computer-readable instructions, and symbols of operations executed by one or more computers/mobile devices, unless otherwise stated. These modules, blocks of computer-readable instructions, and operations shall be understood, wherein execution by a computer/mobile device is mentioned several times, including manipulation by a computer/mobile device processing unit as being representative of electronic signals of data in a structured type. Manipulation of data may convert data, or may keep data at particular positions in a memory system of a computer/mobile device, which can be reconfigured or otherwise changed in a way familiar to those skilled in the art of operations of a computer/mobile device. The term "data structure," as used herein, may be in reference to a structure maintained by data within a physical position of a memory, which may possess specific properties defined by a data format. However, it should be understood that a variety of modules and operations described below may be implemented in hardware (e.g., a discrete circuit, an analog circuit, an application specific integrated circuit, etc.).

Principles of the present invention may employ many computations, communication environments and/or configurations for other general or specific purposes in the disclosed operations. Examples of computing systems, environments or configurations applicable for embodiments of the present invention may include (but are not limited to) tablet computers, mobile phones, personal computers, servers, multi-processor systems, systems primarily with microcomputers, mainframe computers and distributed computing environment, and any of the above systems or devices as included herein.

The term of "module" or "unit" used herein may be a software object or routine executed on a computing system. Various components, modules, engines and services described herein may be implemented as objects or processes executed on a computing system. While the systems and methods described herein may be implemented as software, implementations in a combination of software and hardware, and/or implementations exclusively in hardware are included within the scope of the present invention.

A method and system for regulation and control of a multi-core CPU may run on a computer/mobile device, a computer, one or more of personal computers, servers, etc., and the mobile device may be a system formed by one or more tablet computers, mobile phones, PDAs (Personal Digital Assistant), laptop computers, etc. A computer/mobile device may include any combination of processor, memory, sensor, switching element, power source, clock signal generator, input and output apparatus. Any combination of processor, memory, sensor, switching element, power source, clock signal generator, input and/or output apparatus in the above computer/mobile device may be used to implement a method for regulation and control of a multi-core CPU and/or functions of a system for regulation and control of a multi-core CPU.

Software program commands, used to implement a system for regulation and control of a multi-core CPU, may be stored in a non-transitory computer-readable memory and may be executed by a processor to realize process management in an operating system.

A memory may be a storage medium that can be read by a computer, and the storage medium may be magnetic disc, CD, Read-Only Memory (ROM) or Random Access Memory (RAM).

Turning to FIG. 1, a flow chart of a method for regulation and control of a multi-core CPU may include receiving an operating command associated with regulation and control of a multi-core CPU (block S101), responding to the operating command, and performing regulation and control on CPU cores of the multi-core CPU via a bottom layer core interface according to a preset CPU regulation and control mode.

A preset CPU regulation and control mode may be generated through presetting a CPU regulation and control mode for regulating a number of CPU cores that are turned on, an operating frequency of the CPU cores, and process migration. The CPU regulation and control mode may include a predefined regulation and control mode and an automatic regulation and control mode.

A CPU regulation and control mode may include at least one of: regulating a number of CPU cores that are turned on, regulating an operating frequency of the CPU cores, and migrating processes of the CPU cores. The CPU regulation and control mode may include at least a first regulation and control mode and a second regulation and control mode; the first regulation and control mode may correspond to at least one of the CPU cores of the multi-core CPU that is turned on and runs in a high-frequency state; the second regulation and control mode may correspond to one of the CPU cores of the multi-core CPU that is turned on and runs in a low-frequency state.

CPU regulation and control modes can be divided into two types: predefined regulation and control modes and automatic regulation and control modes. Predefined regulation and control mode may be divided into optimal performance modes and power save modes, an optimal performance mode may correspond to a first regulation and control mode, and a power save mode may correspond to a second regulation and control mode, i.e. an optimal performance mode may indicate that all the CPU cores of a multi-core CPU are turned on and are running in a high-frequency state, and a power save mode may indicate that one CPU core of the multi-core CPU is turned on and is running in a low-frequency state. These modes will be described in further detail below.

In circumstance where a user's mobile device has sufficient power, or can be charged, the user may want to use the mobile device to experience some large games or perform frequent online operations. In such processes of mobile device operations or game experiences, the user may pay more attention to performance of the mobile device. Therefore, an embodiment of the present invention may provide an optimal performance mode of a multi-core CPU such that a mobile device maintains its operation at an optimal performance.

When a CPU regulation and control mode is a first regulation and control mode, a method for regulation and control of a multi-core CPU may include recording a number of CPU cores used by a process and a time of the CPU cores used by the process, migrating a high-frequency process to an idle CPU core for processing, and regulating the idle CPU core to the high-frequency operating state. When a CPU regulation and control mode is a second regulation and control mode, a method for regulation and control of a multi-core CPU may include recording the number of the CPU cores used by the process and the time of the CPU cores used by the process, shutting down the idle CPU cores, keeping a CPU core in operation, and performing frequency reduction processing on the CPU core in operation.

With respect to how to keep a multi-core CPU in a state of optimal performance, a number of CPU cores used by a process may be recorded through a multi-core CPU architecture, and a time of the CPU cores used by the process may be recorded using its subsystem CPUACCT (a node system in Cgroups that may generate a CPU use state report), thereby migrating a high-frequency process to an idle CPU core for processing through its subsystem CPUSET (a node in Cgroups that may allocate independent CPU and memory to a process) according to a number of CPU cores and a time of the CPU cores used by a process, and moreover, the CPU cores in use may be fixed to run in a high-frequency operating state through a subsystem CPUSET, such that all CPU cores of the multi-core CPU may run and may remain in a high-frequency operating state, thus making full use of advantage of strong processing capability of multi-core CPU and improving user experience in playing games or going online.

In circumstance where a user's mobile device is low in power and cannot be charged, the user may only want to use the mobile device for normal communications. Therefore, a power save mode may be provided to shut down idle CPU cores and perform frequency reduction processing on a CPU core in use, thereby attaining a goal of saving power.

In a power save mode, process management may be performed through a multi-core CPU architecture, for example, recording a number of CPU cores used by a process and using a subsystem CPUACCT to record a time of the CPU cores used by the process, shutting down idle CPU cores according to the number of the CPU cores and the time of the CPU cores used, keeping one CPU core in operation, and performing frequency reduction processing on the CPU core in operation within an acceptable range.

In circumstance where a user's mobile device is not low in power and can run normally, the user may want the mobile device to trigger automatic regulation and control of CPU cores according to specific situations, for example, through a specific event. In light of this, an automatic regulation and control mode may be provide to regulate and control operations of any given CPU core according to its own use situation.

Figure 2:
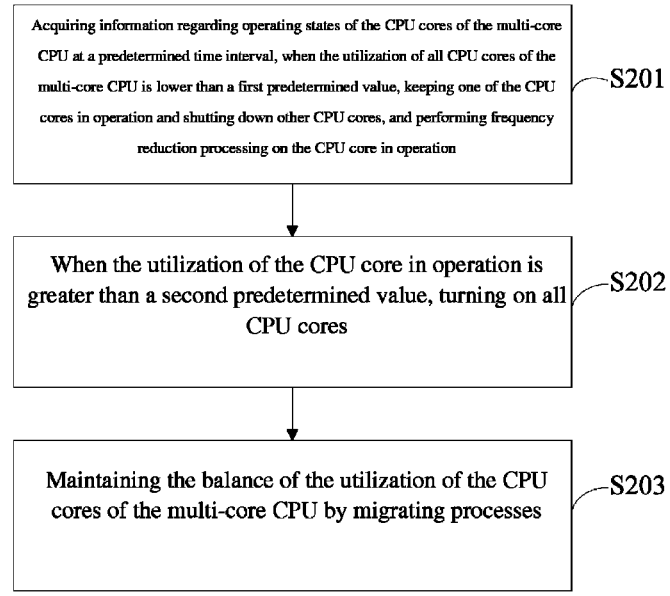
FIG. 2 depicts a flowchart of the example method shown in FIG. 1 in a third regulation and control mode.

With reference to FIG. 2, a CPU regulation and control mode may include a third regulation and control mode; when the CPU regulation and control mode is the third regulation and control mode, a method for regulation and control of a multi-core CPU may include acquiring information regarding operating states of CPU cores of the multi-core CPU at a predetermined time interval (block S201); when a utilization of all CPU cores of the multi-core CPU is lower than a first predetermined value, keeping one of the CPU cores in operation and shutting down other CPU cores, and performing frequency reduction processing on the CPU core in operation. When a utilization of the CPU cores in operation is greater than a second predetermined value, turning on all CPU cores (block S202). Maintaining a balance of a utilization of the CPU cores of the multi-core CPU by migrating processes (block S203). The first predetermined value may be a value in a range of 1% to 50%, for example, 22%, 35%, 43%, 50%, etc. The second predetermined value may be a value in a range of 50% to 99%, for example, 61%, 77%, 89%, 92%, etc.

In an automatic regulation and control mode, information regarding operating states of CPU cores of a multi-core CPU may be acquired at a predetermined time interval; a bottom layer may actively report information regarding an operating state of every CPU core of the multi-core CPU through a CPUACCT subsystem at a predetermined time interval, then the information regarding the operating state may be reported in a socket message, which may be acquired by an automatic regulation and control system. The automatic regulation and control system may automatically issue a regulation and control command according to the acquired information regarding the operating states of the multi-core CPU. When a utilization of all CPU cores of the multi-core CPU is lower than 20%, extra CPU cores may be shut down and one CPU core may be kept in operation, and frequency reduction processing may be performed on the CPU core in operation; when a utilization of every CPU core of the multi-core CPU is lower than 20%, a CPUSET subsystem may be used to shut down idle CPU cores and may only keep one CPU core in operation. When a utilization of the CPU core in operation is greater than 90%, all CPU cores may be turned on; when the utilization of the CPU core in operation is greater than 90%, all or some CPU cores may be turned on through CPUSET to increase a processing capability of the mobile device. A balance of a utilization of the multi-core CPU may be maintained by regulating process migration. When multiple CPU cores are in operation and when it is found that the utilization of multiple CPU cores of the multi-core CPU is not balanced, for example, the utilization of CPU0 is 95% while the utilization of CPU1 is 20%, each CPU core of the multi-core CPU may be kept balanced through a dynamic process migration operation.

A regulation and control mode of a multi-core CPU may encapsulate a Cgroups (i.e., a mechanism provided in Linux kernel for limiting, isolating and recording physical resources used by a process, and physical resources include CPU, I/O port, etc.) interface mainly via a bottom layer core interface, and may call its subsystem CPUSET to realize control on switching, frequency modulation and process migration of CPU cores of the multi-core CPU.

Figure 3:
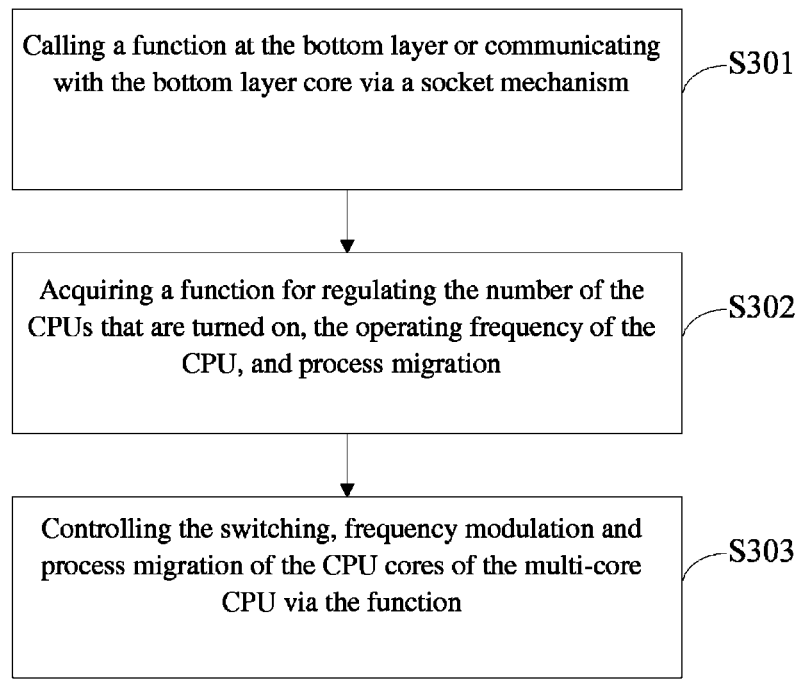
FIG. 3 depicts a flowchart of implementing the example method shown in FIG. 1.

Turning to FIG. 3, a method for regulation and control mode of a multi-core CPU may include controlling switching, frequency modulation and process migration of CPU cores of the multi-core CPU by calling a subsystem CPUSET of the multi-core CPU.

Controlling switching, frequency modulation and process migration of the CPU cores of the multi-core CPU by calling the subsystem CPUSET of the multi-core CPU may include calling a function at a bottom layer or communicating with a bottom layer core via a socket mechanism (block S301). The method for regulation and control mode of a multi-core CPU may include acquiring a function for regulating a number of CPU cores that are turned on, an operating frequency of the CPU cores, and process migration (block 302). The method for regulation and control mode of a multi-core CPU may include controlling switching, frequency modulation and process migration of the CPU cores of the multi-core CPU via the function.

A method for regulation and control mode of a multi-core CPU may include setting up a system service for calling a function at a bottom layer or communicating with a bottom layer core via a socket mechanism; this may be mainly a design of a Deamon service (system service) through Native Service, and the Deamon service may be activated by an init root (a first process for a Linux kernel activation in an Android system) process, thereby achieving a remote calling of a function, specifically it may directly call a function at a bottom layer or communicate with a bottom layer core via a socket mechanism (an inter-process communication mechanism).

Calling a Deamon service and providing a function for regulating a number of CPU cores that are turned on, an operating frequency of the CPU cores, and process migration through the Deamon service; a goal is to use Framework to complete a direct connection between a Native Service and a JAVA API (Application Programming Interface), then complete the calling of the Deamon service through inter-process communication, and subsequently provide a series of JNI interface functions, such as opencpu, closecpu, etc. (opencpu, closecpu, etc. are self-defined function names for opening and closing CPU cores), by aiming at an upper layer.

Controlling switching, frequency modulation and process migration of CPU cores of a multi-core CPU may be implemented through a function for regulating a number of CPU cores that are turned on, an operating frequency of the CPU cores, and process migration. A JNI interface provided by an API may be used by aiming at an upper layer to complete a CPUControl class (the CPUControl class is a self-defined class name), realize a series of API interfaces for use by an Android apk program, and then achieve functions such as opening CPU cores, closing CPU cores, regulating a CPU frequency and progress migration.

Figure 4:
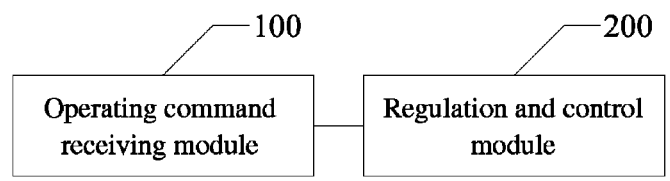
FIG. 4 depicts a structural block diagram of an example system for regulation and control of a multi-core CPU according to an embodiment of the present invention.
Figure 5:
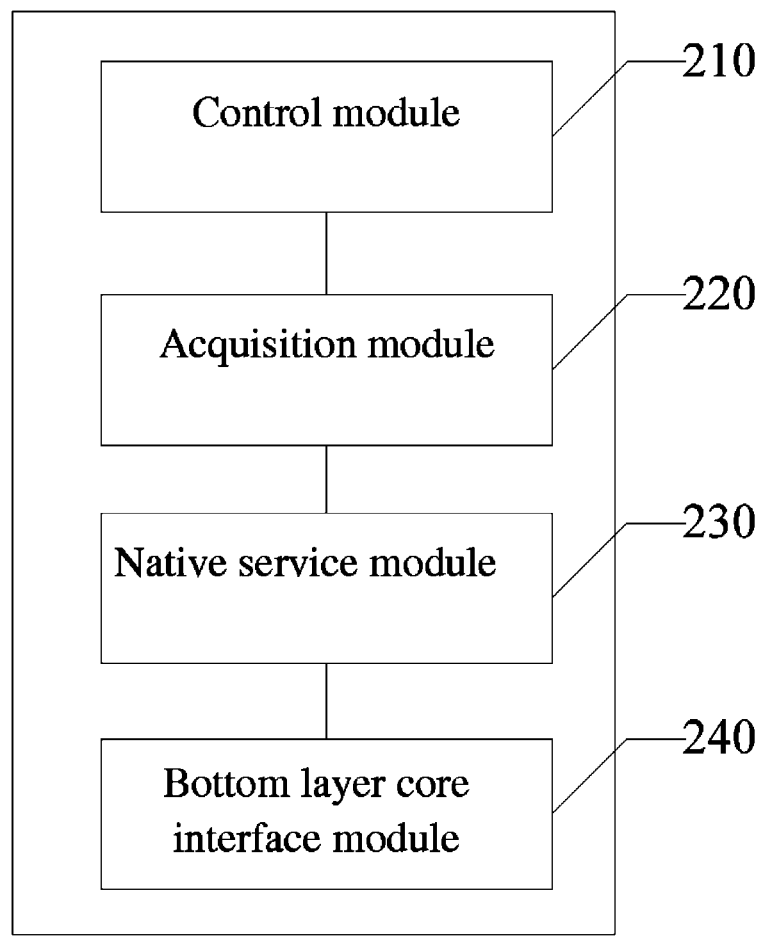
FIG. 5 depicts a structural block diagram of a regulation and control module of the example system shown in FIG. 4.

Turning to FIG. 4, a system for regulation and control of a multi-core CPU may include an operating command receiving module 100 for receiving an operating command associated with regulation and control of the multi-core CPU; a regulation and control module 200 for responding to the operating command, and performing regulation and control on CPU cores of the multi-core CPU via a bottom layer core interface according to a preset CPU regulation and control mode.

A CPU regulation and control mode of the system may include at least one of: regulating a number of CPU cores that are turned on, regulating an operating frequency of the CPU cores, and migrating processes of the CPU cores. The CPU regulation and control mode may include at least a first regulation and control mode and a second regulation and control mode; the first regulation and control mode may correspond to at least one CPU core of the multi-core CPU that is turned on and runs in a high-frequency state; the second regulation and control mode may correspond to one CPU core of the multi-core CPU that is turned on and runs in a low-frequency state.

When a CPU regulation and control mode is the first regulation and control mode, the regulation and control module 200 may be used for recording a number of CPU cores used by a process and a time of the CPU cores used by the process, for migrating a high-frequency process to an idle CPU core for processing, and for regulating the idle CPU core to the high-frequency operating state.

When a CPU regulation and control mode is a second regulation and control mode, the regulation and control module 200 may be used for recording a number of CPU cores used by a process and a time of the CPU cores used by the process, for shutting down idle CPU cores and keeping a CPU core in operation, and for performing frequency reduction processing on the CPU core in operation.

A CPU regulation and control mode for a system may include a third regulation and control mode; when a CPU regulation and control mode is the third regulation and control mode, the regulation and control module 200 may be used for acquiring information regarding operating states of CPU cores of the multi-core CPU at a predetermined time interval, and for, when a utilization of all CPU cores of the multi-core CPU is lower than a first predetermined value, keeping one of the CPU cores in operation and shutting down other CPU cores, and performing frequency reduction processing on the CPU core in operation. Moreover, the regulation and control module 200 may also be used for, when a utilization of the CPU cores in operation is greater than a second predetermined value, turning on all CPU cores, and for maintaining a balance of a utilization of the CPU cores of the multi-core CPU by migrating processes.

The regulation and control module 200 may be used for controlling switching, frequency modulation and process migration of the CPU cores of the multi-core CPU by calling a subsystem CPUSET of the multi-core CPU. The regulation and control module 200 may include a native service module 230 for calling a function at a bottom layer or communicating with a bottom layer core via a socket mechanism; an acquisition module 220 for acquiring a function for regulating a number of CPU cores that are turned on, an operating frequency of the CPU cores, and process migration; and a control module 210 for controlling switching, frequency modulation and process migration of the CPU cores of the multi-core CPU via the function.

The regulation and control module 200 may include a bottom layer core interface module 240 for encapsulating a Cgroups interface, and calling a subsystem CPUSET of the multi-core CPU to realize control on switching, frequency modulation and process migration of the CPU cores of the multi-core CPU. The native service module 230 may be used to set up a system service for calling a function at a bottom layer or communicating with a bottom layer core via a socket mechanism. A frame module for calling the system service and providing a function for regulating a number of CPU cores that are turned on, an operating frequency of the CPU cores, and process migration through the system service. An API module for controlling switching, frequency modulation and process migration of CPU cores of a multi-core CPU through a function for regulating a number of CPU cores that are turned on, an operating frequency of the CPU cores, and process migration. Functions of all of the above functional units have been described in detail in the methods above and therefore will not be described.

A method and system for regulation and control of a multi-core CPU may provide a predefined regulation and control mode and an automatic regulation and control mode of a multi-core CPU in response to specific use situations and performance demand of a user's mobile device, such that the mobile device may run in an optimal performance state when power is sufficient, and may run in a power save mode when the power is insufficient. In addition, a user may further set up an automatic regulation and control mode, such that a mobile device can automatically regulate switching, frequency modulation and process migration functions of a CPU, based on a use situation of its CPU. Accordingly, a mobile device user can choose to input commands in different scenarios to regulate and control a working state of every CPU core of a multi-core CPU, improve a processing capability of a multi-core CPU or attain a goal of saving energy and electric power.

It should be understood that applications of the present invention are not limited to the above examples. Improvements and/or modifications may be made based on the description above, and all of these improvements or modifications shall be encompassed by the appended claims.

The invention claimed is:

1. A method for regulation and control of a multi-core central processing unit (CPU), the method comprising:

receiving an operating command associated with regulation and control of the multi-core CPU;
responding to the operating command, and performing regulation and control on CPU cores of the multi-core CPU via a bottom layer core interface according to a CPU regulation and control mode that is predefined;
wherein the bottom layer core interface is exposed by a kernel of an operating system; and
controlling switching of power states, frequency modulation and process migration of the CPU cores of the multi-core CPU by calling a subsystem of the multi-core CPU;
wherein the CPU regulation and control mode comprises a third regulation and control mode;
when the CPU regulation and control mode is the third regulation and control mode, the method further comprises:
acquiring information regarding operating states of CPU cores, associated with the third regulation and control mode, of the multi-core CPU at a predetermined time interval;
when a utilization of all the CPU cores, associated with the third regulation and control mode, of the multi-core CPU is lower than a first predetermined value, keeping one of the CPU cores associated with the third regulation and control mode in operation and shutting down other CPU cores associated with the third regulation and control mode, and performing frequency reduction processing on the CPU core in operation;
when a utilization of the CPU cores in operation is greater than a second predetermined value, turning on all CPU cores; and
maintaining a balance of a utilization of CPU cores of the multi-core CPU by migrating processes on the CPU cores.

2. The method as set forth in claim 1, wherein the CPU regulation and control mode at least comprises a first regulation and control mode and a second regulation and control mode;
the first regulation and control mode corresponds to at least one of the CPU cores, of the multi-core CPU, that is turned on and runs in a high-frequency state;
the second regulation and control mode corresponds to one of the CPU cores, of the multi-core CPU, that is turned on and runs in a low-frequency state;
wherein, when the CPU regulation and control mode is the first regulation and control mode, the method further comprises:
recording a number of CPU cores associated with first regulation and control mode, used by a process associated with first regulation and control mode, and a time of the CPU cores associated with first regulation and control mode and used by the process; and
migrating the high-frequency process to an idle CPU core for processing, and regulating the idle CPU core to the high-frequency operating state;
wherein, when the CPU regulation and control mode is the second regulation and control mode, the method further comprises:
recording a number of CPU cores associated with second regulation and control mode, used by a process associated with second regulation and control mode, and a time of the CPU cores associated with second regulation and control mode and used by the process; and shutting down the idle CPU cores, keeping at least one CPU core in operation, and performing frequency reduction processing on the at least one CPU core in operation.

3. The method as set forth in claim 1, wherein controlling the switching of the power states, the frequency modulation and the process migration of the CPU cores of the multi-core CPU by calling a subsystem of the multi-core CPU comprises:
calling a function at a bottom layer or using a socket mechanism to communicate with a bottom layer core;
acquiring a function for regulating a number of CPU cores that are turned on, an operating frequency of the CPU cores that are turned on, and process migration; and
controlling the switching of the power states, frequency modulation and process migration of CPU cores of the multi-core CPU via the function.

4. A method for regulation and control of a multi-core CPU, the method comprising:
receiving an operating command associated with regulation and control of the multi-core CPU; and
responding to the operating command, and performing regulation and control on CPU cores of the multi-core CPU via a bottom layer core interface according to a CPU regulation and control mode that is predefined;
wherein the bottom layer core interface is exposed by a kernel of an operating system;
wherein the CPU regulation and control mode comprises a third regulation and control mode;
when the CPU regulation and control mode is the third regulation and control mode, the method further comprises:
acquiring information regarding operating states of CPU cores of the multi-core CPU, associated with the third regulation and control mode, at a predetermined time interval;
when a utilization of all CPU cores of the multi-core CPU is lower than a first predetermined value, keeping one of the CPU cores in operation and shutting down other CPU cores, and performing frequency reduction processing on the CPU core in operation;
when a utilization of CPU cores in operation is greater than a second predetermined value, turning on all CPU cores; and
maintaining a balance of utilization of the CPU cores of the multi-core CPU, associated with the third regulation and control mode, by migrating processes on the CPU cores.

5. The method as set forth in claim 4, wherein the CPU regulation and control mode comprises at least one of: regulating a number of CPU cores that are turned on, regulating an operating frequency of the CPU cores that are turned on, and migrating processes of CPU cores.

6. The method as set forth in claim 4, wherein the CPU regulation and control mode at least comprises: a first regulation and control mode and a second regulation and control mode;
the first regulation and control mode corresponds to at least one of the CPU cores of the multi-core CPU that is turned on and runs in a high-frequency state;
the second regulation and control mode corresponds to one of the CPU cores of the multi-core CPU that is turned on and runs in a low-frequency state.

7. The method as set forth in claim 6, wherein when the CPU regulation and control mode is the first regulation and control mode, the method further comprises:

recording a number of CPU cores used by a process and a time of the CPU cores used by the process; and migrating the high-frequency process to an idle CPU core for processing, and regulating the idle CPU core to the high-frequency operating state.

8. The method as set forth in claim 6, wherein when the CPU regulation and control mode is the second regulation and control mode, the method further comprises:

recording a number of CPU cores associated with the second regulation and control mode and used by a process associated with the second regulation and control mode, and a time of the CPU cores associated with the second regulation and control mode and used by the process; and shutting down idle CPU cores, keeping at least one CPU core in operation, and performing frequency reduction processing on the at least one CPU core in operation.

9. The method as set forth in claim 4, further comprising: controlling switching of the power states, frequency modulation and process migration of CPU cores of the multi-core CPU by calling a subsystem of the multi-core CPU.

10. The method as set forth in claim 9, wherein controlling the switching of the power states, frequency modulation and process migration of the CPU cores of the multi-core CPU by calling a subsystem of the multi-core CPU comprises:

calling a function at a bottom layer or using a socket mechanism to communicate with a bottom layer core;

acquiring a function for regulating a number of CPU cores that are turned on, an operating frequency of the CPU cores that are turned on, and process migration; and controlling switching of the power states, frequency modulation and process migration of CPU cores of the multi-core CPU via the function.

11. A non-transitory computer readable medium comprising instructions, wherein the instructions cause a regulation and control of a multi core CPU when the instructions are executed by one or more processors, the non-transitory computer readable medium comprising:

an operating command receiving module for receiving an operating command associated with regulation and control of the multi-core CPU; and a regulation and control module for responding to the operating command, and performing regulation and control on CPU cores of the multi-core CPU via a bottom layer core interface according to a CPU regulation and control mode that is predefined;

wherein the bottom layer core interface is exposed by a kernel of an operating system;

wherein the CPU regulation and control mode comprises a third regulation and control mode;

when the CPU regulation and control mode is the third regulation and control mode, the regulation and control module is used for acquiring information regarding operating states of the CPU cores of the multi-core CPU, associated with the third regulation and control mode, at a predetermined time interval, and for, when a utilization of all CPU cores of the multi-core CPU is lower than a first predetermined value, keeping one of the CPU cores in operation and shutting down other CPU cores, and performing frequency reduction processing on the CPU core in operation; and the regulation and control module is also used for, when a utilization of CPU cores in operation is greater than a second predetermined value, turning on all CPU cores, and for maintaining a balance of a utilization of the CPU cores of the multi-core CPU by migrating processes on the CPU cores.

12. The non-transitory computer readable medium of claim 11, wherein the CPU regulation and control mode at least comprises: a first regulation and control mode and a second regulation and control mode;

the first regulation and control mode corresponds to at least one of the CPU cores of the multi-core CPU that is turned on and runs in a high-frequency state;

the second regulation and control mode corresponds to one of the CPU cores of the multi-core CPU that is turned on and runs in a low-frequency state.

13. The non-transitory computer readable medium of claim 12, wherein when the CPU regulation and control mode is the first regulation and control mode, the regulation and control module is used for recording a number of CPU cores associated with the first regulation and control mode and used by a process associated with the first regulation and control mode, and a time of the CPU cores, associated with the third regulation and control mode and used by the process, for migrating a high-frequency process to an idle CPU core for processing, and for regulating the idle CPU core to the high-frequency operating state.

14. The non-transitory computer readable medium of claim 12, wherein when the CPU regulation and control mode is the second regulation and control mode, the regulation and control module is used for recording a number of CPU cores associated with the second regulation and control mode and used by a process associated with the second regulation and control mode, and a time of the CPU cores used by the process, for shutting down idle CPU cores and keeping a CPU core in operation, and for performing frequency reduction processing on the CPU core in operation.

15. The non-transitory computer readable medium of claim 11, wherein the regulation and control module is used for controlling switching of the power states, frequency modulation and process migration of CPU cores of the multi-core CPU by calling a subsystem of the multi-core CPU.

16. The non-transitory computer readable medium of claim 15, wherein the regulation and control module comprises:

a native service module for calling a function at a bottom layer or using a socket mechanism to communicate with a bottom layer core;

an acquisition module for acquiring a function for regulating a number of CPU cores that are turned on, an operating frequency of the CPU cores that are turned on, and process migration; and a control module for controlling switching of the power states, frequency modulation and process migration of CPU cores of the multi-core CPU via the function.

* * * * *